July 21, 1970   L. G. MALISSA   3,521,414
BASE FOR ROOF MOUNTED DEVICES
Filed Aug. 23, 1968   2 Sheets-Sheet 1
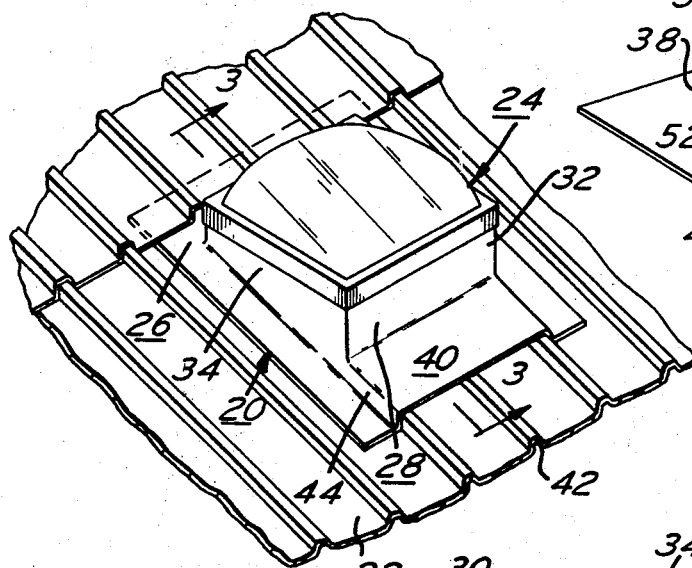
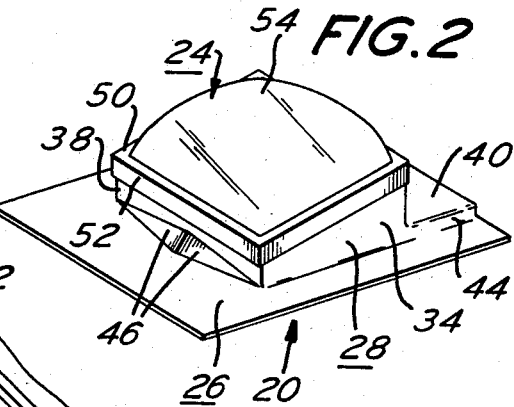
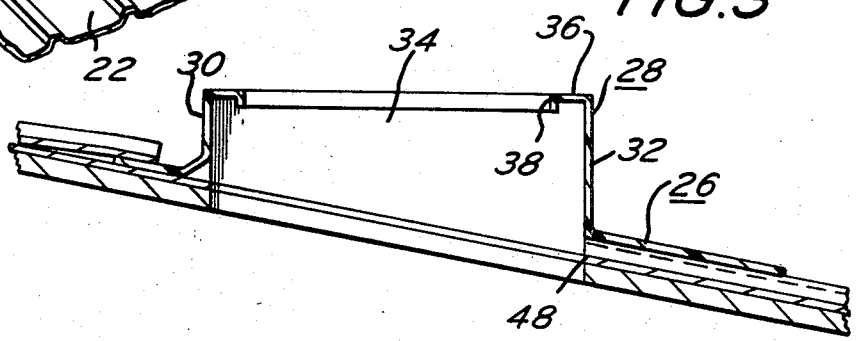
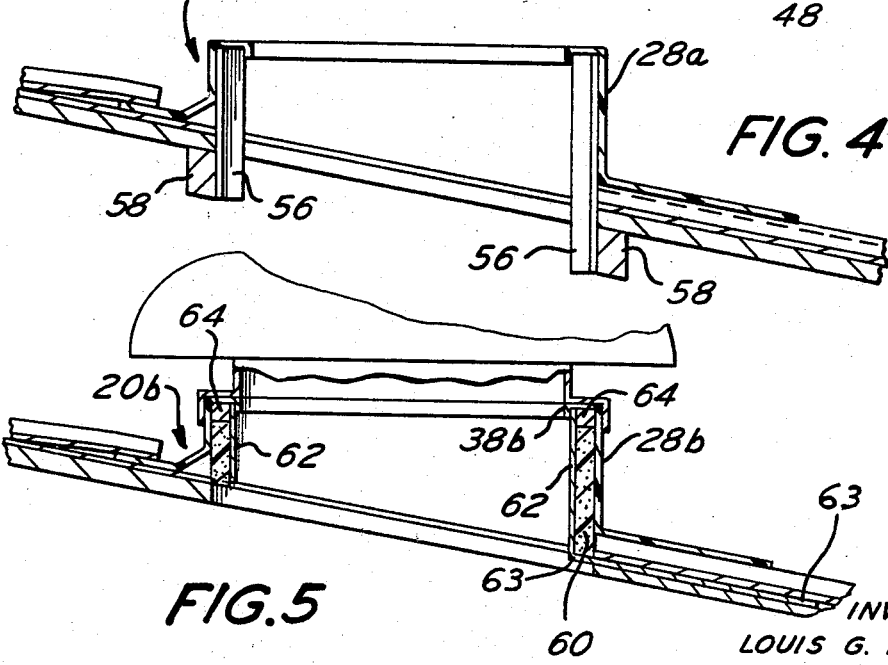
INVENTOR
LOUIS G. MALISSA
BY Jacob Trachtman July 21, 1970 L. G. MALISSA 3,521,414
BASE FOR ROOF MOUNTED DEVICES
Filed Aug. 23, 1968 2 Sheets-Sheet 2

INVENTOR
LOUIS G. MALISSA
BY Jacob Trachtman

United States Patent Office 3,521,414
Patented July 21, 1970

3,521,414
BASE FOR ROOF MOUNTED DEVICES
Louis G. Malissa, Wyncote, Pa., assignor to Penn Ventilator Co. Inc., Philadelphia, Pa., a corporation of Pennsylvania
Filed Aug. 23, 1968, Ser. No. 754,789
Int. Cl. E04d 13/03
U.S. Cl. 52—105                               7 Claims

ABSTRACT OF THE DISCLOSURE

A one piece, molded plastic base for mounting ventilators, skylights, trap doors and the like in a weatherproof manner on the roof of a building comprising a base plate having an opening therethrough, an upright wall integral with extending around the edge of the opening in said base plate, and a flange integral with the upper edge of the said wall, said base plate adapted to sit on the roof with the opening in the base plate being over an opening in the roof and the wall adapted to support the accessory thereon.

The invention relates to a base for mounting a ventilator, skylight, trap door and the like on the roof of a building and more particularly to a one piece molded plastic mounting base.

To mount a ventilator, skylight, trap door or similar roof accessory on the roof of a building it is the practice to secure a mounting base on the roof around an opening in the roof and support the accessory on the mounting base. Heretofore such mounting bases were formed of sheet metal and each was designed to fit on a particular style of roof and accommodate a particular accessory. Such sheet metal bases have many disadvantages. For example, they are heavy so as to be difficult to handle when installing them, particularly on a slanted roof. Also, they require periodic painting so as to prevent rusting. In addition, such mounting bases are designed to accommodate only one size of accessory so that a large stock of different sizes must be maintained to permit installation of accessories of different sizes.

The present invention relates to a one piece, molded plastic mounting base adapted to be seated on and secured to a roof around an opening in the roof and adapted to support thereon a roof accessory such as a ventilator, skylight, trap door or the like. The mounting base has a base plate which sits on the roof and an integral accessory supporting wall extending upwardly from the base plate around the edge of an opening in the base plate. The accessory is mounted on the supporting wall and extends across the opening.

For the purpose of illustrating the invention there is shown in the drawings forms which are presently preferred; it being understood, however, that this invention is not limited to the precise arrangement and instrumentalities shown.

FIG. 1 is a perspective view of a mounting base of the present invention seated on a roof and having an accessory thereon.

FIG. 2 is a perspective view of the mounting base of FIG. 1 with the accessory thereon but showing the back of the mounting base.

FIG. 3 is a sectional view taken along line 3—3 of FIG. 1 but without the accessory.

FIG. 4 is a sectional view similar to FIG. 3 but showing a modification of the mounting base of the present invention.

FIG. 5 is a sectional view similar to FIG. 3 but showing still another modification of the mounting base of the present invention.

Figure 6:
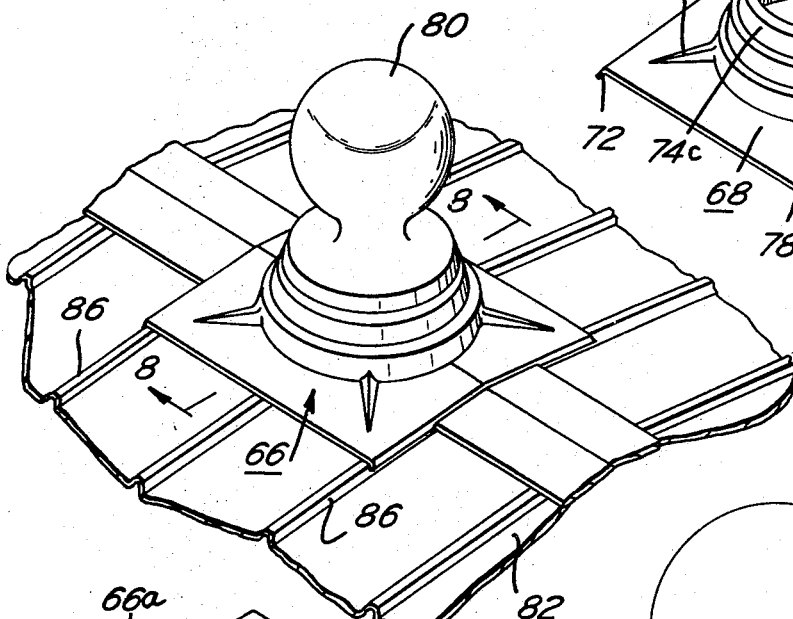
FIG. 6 is a perspective view of a further modification of the mounting base of the present invention which can accommodate accessories of different sizes with the mounting base seated on a roof and supporting an accessory.

Referring initially to FIGS. 1–3, a mounting base of the present invention is generally designated as 20. As shown, the mounting base 20 is adapted to be mounted on a slanted, ribbed metal roof 22 and is adapted to support a rectangular accessory 24, such as a skylight.

The mounting base 20 comprises a flat base plate 26 and a rectangular wall 28 integral with an extending upwardly from the base plate 26 and surrounding an opening in substantially the center of the base plate. The base plate 26 extends at an angle with respect to wall 28 corresponding to the pitch of the roof 22. Thus, the back side 30 of the wall 26 is shorter than the front side 32 of the wall and the other two sides 34 vary in height between that of the back side and the front side. A short flange 36 extends inwardly from the upper edge of the wall 28 and a lip 38 extends downwardly from the inner edge of the flange 36. (See FIG. 3.) The portion 40 of the base plate 26 across the front side 32 of the wall 28 is raised above the base plate 26 a distance substantially equal to the height of the ribs 42 of the roof 22. The raised portion 40 forms a pocket and is connected to the base plate 26 by flange 44. A "cricket" is provided at the junction of the back side 30 of the wall 26 and the base plate 24 by a pair of surfaces 46 which extend upwardly to a peak at the center of the back side 30. This prevents water from collecting along the back side 30 of the wall 26.

The mounting base 20 is seated on the roof 22 with the base plate 26 resting on the roof and the back edge portion of the base plate being sandwiched between two sheets of the roof so as to secure the mounting base in place. The opening through the wall 28 is in alignment with opening 48 in the roof 22. The raised portion 40 of the base plate extends across and over at least two of the ribs 42 of the roof 22 with the flange 44 extending downwardly along the sides of the ribs. This secures the mounting base against lateral movement on the roof 22, and permits the base plate 26 to be fully seated on the roof. If desired the space between the roof and the raised portion 40 of the base plate can be filled with a plug of wood or plastic. The accessory 24, which is shown to be a skylight, is seated on the wall 28 of the mounting base 20. The skylight 24 comprises a frame 50 seated on the flange 36 of the wall 28 and having a flange 52 extending downwardly along the outer surface of the wall. A sheet 54 of a transparent or translucent material, such as glass or plastic, is mounted in the frame 50 and extends across the opening 48 in the roof.

The mounting base 20 is of a one piece construction and is made of a plastic, such as a vinyl. It can be vacuum formed or draw molded from a single sheet of plastic so that it is relatively easy to manufacture. Being formed of a plastic, the mounting base 20 is light in weight so that it can be easily handled during the assembling of the mounting base on a roof. Also, the mounting base will be permanently colored and will never rust or require painting. In addition, since the mounting base has no seams it is leakproof. Although the wall 28 of the mounting base 20 is shown as being rectangular, it can be any polygonal shape or can be round depending on the shape of the accessory to be supported by the mounting base. Also, the base plate 26 can be perpendicular to the wall for use on a flat roof, or the base plate can be V-shaped for use on a peaked roof.

Referring to FIG. 4, a modification of the mounting base of the present invention is generally designated as 20a. Mounting base 20a is identical in construction to the mounting base 20 of FIGS. 1–3 except that a separate metal angle rod 56 is secured to and extends along each corner of the wall 28a. The angle rods 56 are of a length to extend downwardly through the opening 48 in the roof 22 and are secured to structural members 58 on the inner surface of the roof. The angle rods 56 reinforce the mounting base 20a and help transmit the weight of the accessory directly to the structural members 58.

Referring to FIG. 5, there is shown still a further modification of the mounting base of the present invention, generally designated as 20b. Mounting base 20b is identical in construction to the mounting base 20 of FIGS. 1–3 except that the wall 28b has an inner lining 60 of an insulation material. A sheet metal liner 62 extends downwardly from the lip 38b parallel to but spaced from the inner surface of the wall 28b. The upper edge of the liner 62 is secured against the lip 38b by a block 64 of wood or plastic while the bottom edge 63 is bent to extend under the roof 22 at the lower edge of the roof opening 48. The cavity between the liner 62 and the wall 28b is filled with the insulation 60 which may be a foamed plastic such as urethane.

Figure 7:
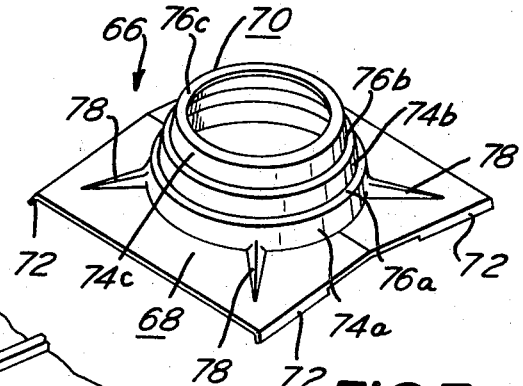
FIG. 7 is a perspective view of the mounting base of FIG. 6 alone.
Figure 8:
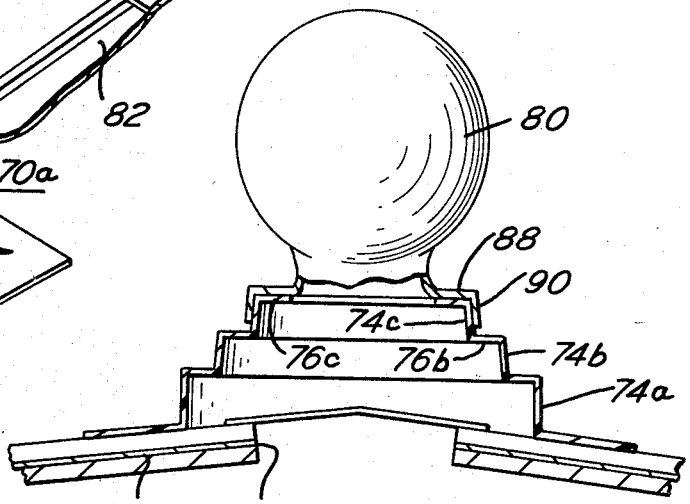
FIG. 8 is a sectional view taken along line 8—8 of FIG. 6.

Another modification of the mounting base of the present invention, generally designated as 66, is shown in FIGS. 6–8 inclusive. Mounting base 66 has a V-shaped base plate 68 and a circular wall 70 around an opening at the peak of the base plate. The base plate 68 has downwardly extending flanges 72 along opposite edges thereof. The wall 70 is stepped having a plurality of conical sections 74a, 74b and 74c of successively smaller diameters, and radially inwardly extending flanges 76a, 76b and 76c at the upper end of the conical sections. The flange 76a extends between the upper edge of the bottom conical section 74a and the bottom of the middle conical section 74b, and the flange 76b extends between the upper edge of the middle conical section 74b and the upper edge of the top conical section 74c. Reinforcing ribs 78 are provided in the base plate 72 and extend radially from the wall 70. The mounting base 66 is made of a single piece of plastic and can be formed by draw molding.

As shown in FIGS. 6 and 8, the mounting base 66 is adapted to support an accessory 80, which is shown to be a ventilator, at the peak of a roof 82. The mounting base 66 is seated on the roof 82 with the apex of the base plate 68 being along the apex of the roof and with the opening in the wall 70 being in alignment with the opening 84 in the roof. The flanges 72 of the base plate 68 extend downwardly along the sides of ribs 86 on the roof 82 to prevent lateral movement of the mounting base 66. The accessory 80 has a base 88 which sits on the uppermost flange 76c of the wall 70 and a rim 90 extending downwardly from the base 88 along the uppermost conical section 74c of the wall.

Figure 9:
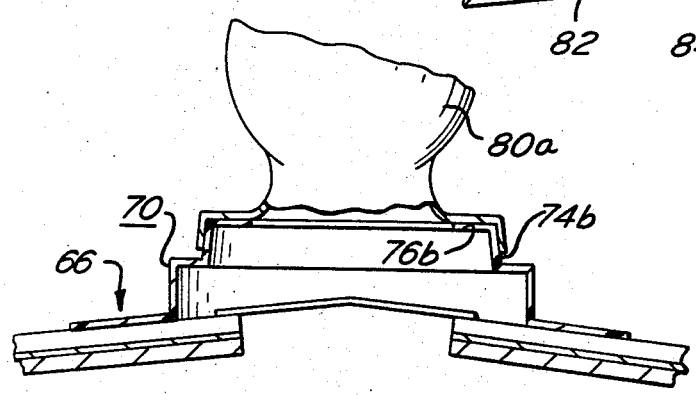
FIG. 9 is a sectional view similar to FIG. 8 but showing the manner of adjusting the mounting base to accommodate a different size of an accessory.

The stepped construction of the wall 70 of the mounting base 66 permits the mounting base to be used to accommodate accessories of different sizes. If the mounting base 66 is to be used to support an accessory having a base larger than the uppermost conical section 74c of the wall 70, the uppermost conical section 74c can be easily removed by cutting along the junction of the uppermost conical section 74c and the middle flange 76b. As shown in FIG. 9, the larger accessory 80a can then be seated on the middle flange 76b of the wall. If still a larger accessory is to be supported on the mounting base 66, the middle conical wall 74b can be similarly removed to permit the accessory to be supported on the lowermost flange 76a.

Figure 10:
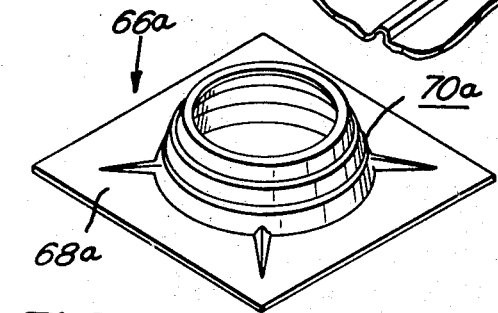
FIG. 10 is a perspective view of a mounting base similar to that of FIG. 7 but which is adapted to be used on a flat roof.

Referring to FIG. 10 another modification of the mounting base of the present invention is generally designated as 66a. Mounting base 66a is identical in construction to the mounting base 66 shown in FIG. 7 except that the base plate 68a is flat so that the mounting base 66a can be used on a flat roof. Although the mounting bases 66 and 66a are shown as being circular, stepped walls 70 and 70a respectively, it should be understood that the stepped wall can also be polygonal. Also, the base plate can be at an angle to the wall so as to permit the mounting base to be used on a slanted roof.

What is claimed is:

1. A one-piece, molded plastic mounting base for mounting an accessory on a ribbed roof comprising a base plate having an opening therethrough, an upright wall integral with and extending around the edge of the opening in said base plate, and a flange integral with the upper edge of the said wall, said base plate adapted to sit on the roof with the opening in the base plate being over an opening in the roof and the wall adapted to support the accessory thereon, said base plate being provided with a raised portion forming a pocket for receiving therewithin a plurality of ribs of said roof.

2. A mounting base in accordance with claim 1 in which the base plate has a pair of spaced parallel flanges defining said pocket which are adapted to engage the sides of ribs on the roof to prevent lateral movement of the mounting base on the roof.

3. A mounting base in accordance with claim 1 in which a lip extends downwardly from the inner edge of the flange on the wall, a sheet metal liner extends downwardly from the lip parallel to and spaced from the inner surface of the wall, and insulation material filling the space between the liner and the wall.

4. A mounting base in accordance with claim 1 in which the base plate is V-shaped and the opening in the base plate is at the apex of the base plate.

5. A mounting base in accordance with claim 1 in which the base plate extends at an angle with respect to the wall.

6. A one-piece, molded plastic mounting base for mounting an accessory on a roof comprising a base plate having an opening therethrough, an upright wall integral with and extending around the edge of the opening in said base plate, and a flange integral with the upper edge of the said wall, said base plate adapted to sit on the roof with the opening in the base plate being over an opening in the roof and the wall adapted to support the accessory thereon, said wall being stepped having sections of progressively smaller dimensions connected by inwardly extending flanges, said sections adapted to support accessories of different sizes.

7. A one-piece, molded plastic mounting base for mounting an accessory on a roof comprising a base plate having an opening therethrough, an upright wall integral with and extending around the edge of the opening in said base plate, and a flange integral with the upper edge of the said wall, said base plate adapted to sit on the roof with the opening in the base plate being over an opening in the roof and the wall adapted to support the accessory thereon, said wall being polygonal and having a separate metal angle rod secured to and extending along the inner surface of each corner of said wall, each of said rods extending from the flange to beyond the base plate so as to permit the rods to be connected to the roof.

References Cited

UNITED STATES PATENTS

| | | | |
|---|---|---|---|
| 316,861 | 4/1885 | Apple | 285—43 |
| 2,168,798 | 8/1939 | Hirschman | 285—42 |
| 2,345,500 | 3/1944 | Petter | 52—200 X |
| 3,065,572 | 11/1962 | Weingartner | 52—20 X |
| 3,137,099 | 6/1964 | Wasserman | 52—204 X |
| 3,209,669 | 10/1965 | Bayne | 52—200 X |
| 3,247,632 | 4/1966 | Bloxsom | 52—200 |
| 3,385,012 | 5/1968 | Lovegreen | 52—100 X |

PRICE C. FAW, JR., Primary Examiner

U.S. Cl. X.R.

52—98, 200, 219; 285—43